(12) United States Patent
Hasse et al.

(10) Patent No.: US 11,524,189 B2
(45) Date of Patent: Dec. 13, 2022

(54) CONNECTOR

(71) Applicant: RELIANCE INDUSTRIES, LLC, Arvada, CO (US)

(72) Inventors: William Hasse, Denver, CO (US); Joshua Smith, Arvada, CO (US)

(73) Assignee: RELIANCE INDUSTRIES, LLC, Arvada, CO (US)

(*) Notice: Subject to any disclaimer, the term of this patent is extended or adjusted under 35 U.S.C. 154(b) by 0 days.

(21) Appl. No.: 17/335,632

(22) Filed: Jun. 1, 2021

(65) Prior Publication Data
US 2021/0379426 A1 Dec. 9, 2021

Related U.S. Application Data

(60) Provisional application No. 63/036,144, filed on Jun. 8, 2020.

(51) Int. Cl.
*A62B 35/00* (2006.01)
*F16B 45/04* (2006.01)

(52) U.S. Cl.
CPC ........ *A62B 35/0037* (2013.01); *F16B 45/045* (2021.05); *F16B 45/049* (2021.05)

(58) Field of Classification Search
CPC ............. A62B 35/0037; A62B 35/0068; F16B 45/045; F16B 45/049; F16B 45/04; Y10T 24/45387
See application file for complete search history.

(56) References Cited

U.S. PATENT DOCUMENTS

| | | | |
|---|---|---|---|
| 5,114,260 A * | 5/1992 | Hart | F16G 15/06 403/24 |
| 5,362,117 A | 11/1994 | Bennett, Jr. | |
| 5,433,547 A * | 7/1995 | Hart | F16B 39/32 403/24 |
| 6,401,312 B1 | 6/2002 | Wang | |
| 7,540,140 B1 * | 6/2009 | Diaz | F16G 15/06 70/52 |
| 8,938,864 B2 | 1/2015 | Casebolt | |
| 9,435,484 B1 | 9/2016 | Yang et al. | |
| 10,143,866 B2 | 12/2018 | Yang et al. | |
| 10,300,315 B2 | 5/2019 | Yang et al. | |
| 2003/0070267 A1 | 4/2003 | Kung | |
| 2010/0269314 A1 * | 10/2010 | Petzl | F16B 45/04 24/591.1 |

(Continued)

*Primary Examiner* — Robert Sandy
*Assistant Examiner* — Rowland Do
(74) *Attorney, Agent, or Firm* — Sandberg Phoenix & von Gontard PC (57) ABSTRACT

A connector for use with a fall protection system includes a body, a gate, and a double action locking mechanism. The body includes a spine and two arms extending from the spine to form a gate opening, the arms defining axially aligned first and second apertures respectively. The gate is adapted and configured to move axially through the first and second apertures. In an open position, the gate extends through the first aperture, but a forward end of the gate is spaced rearwardly of the second aperture. In a closed position, the gate extends through the first aperture and the second aperture. The double action locking mechanism is adapted and configured to require application of two distinct and different forces to unlock the locking mechanism and permit the gate to move to the open position.

20 Claims, 6 Drawing Sheets

(56) References Cited

U.S. PATENT DOCUMENTS

2018/0345054 A1* 12/2018 Yang ................. A62B 35/0068
2020/0129790 A1*  4/2020 Stephenson ........ A62B 35/0025
2021/0353982 A1* 11/2021 Hung ................. A62B 35/0043

* cited by examiner

CONNECTOR

CROSS-REFERENCE TO RELATED APPLICATIONS

This application claims the benefit of U.S. Provisional Application No. 63/036,144, filed Jun. 8, 2020, which is entitled "Connector" and which is incorporated herein by reference in its entirety.

STATEMENT REGARDING FEDERALLY SPONSORED RESEARCH

Not Applicable.

BACKGROUND

A connector for use with a fall protection system is disclosed. Fall protection systems typically include a harness worn by a user, an anchor, and a line connecting the harness to the anchor. It is desirable to allow for a quick connect/disconnect connector to permit the line and the harness (or the line and the anchor) to be connected and disconnected. For example, a user may need to reposition between anchors or lines, and an easy and quick to use connector facilitates switching between lines attached to different anchors.

However, the connector must also provide a secure connection in order for the fall protection system to provide adequate safety to the user. For example, if a connector moves too easily between an open and a closed position it may be inadvertently opened endangering a user.

BRIEF SUMMARY OF THE INVENTION

Briefly, a connector is disclosed which provides for an easy and quick-to-use connector that uses a double action locking mechanism to reduce the potential for inadvertent opening of the connector.

In one embodiment, a connector for use with a fall protection system includes a body, a gate, and a double action locking mechanism. The body includes a spine and two arms extending from the spine to form a gate opening. A first arm of the two arms defines a first aperture and a second arm of the two arms defines a second aperture. The first and second apertures are axially aligned. The gate is adapted and configured to move axially through the first and second apertures between an open position and a closed position. The gate has a forward end and a rearward end. In the open position, the gate extends through the first aperture but the forward end of the gate is spaced rearwardly of the second aperture. In the closed position, the gate extends through the first aperture and the second aperture. The double action locking mechanism is adapted and configured to selectively permit or prevent the gate to move into the open position. The double action locking mechanism is adapted and configured to require application of two distinct and different forces to unlock the locking mechanism and permit the gate to move to the open position.

DESCRIPTION OF THE DRAWINGS

In the accompanying drawings which form part of the specification.

DETAILED DESCRIPTION

The following detailed description illustrates the disclosed connector by way of example and not by way of limitation. The description enables one skilled in the art to make and use the disclosed connector, describes several embodiments, adaptations, variations, alternatives, and uses of the connector, including what is presently believed to be the best mode of making and using the connector. Additionally, it is to be understood that the connector is not limited to the details of construction and the arrangements of components set forth in the following description or illustrated in the drawings. The claimed invention is capable of other embodiments and of being practiced or being carried out in various ways. Also, it is to be understood that the phraseology and terminology used herein is for the purpose of description and should not be regarded as limiting.

Referring generally to FIGS. 1-6, a connector 100 is shown and described. Generally, the connector 100 is adapted and configured to provide for a connection between a Self-Retracting Lanyard (SRL) and a harness or anchor. The construction of the connector 100 allows for easy use of the connector and provides for a connector that reduces the potential for inadvertent opening of the connector. For example, the connector 100 provides for a double action locking mechanism that is capable of being operated with a single hand but requires force to be applied in two distinct and different directions. This prevents inadvertent operation of the locking mechanism and inadvertent opening of the connector 100.

Figure 1:
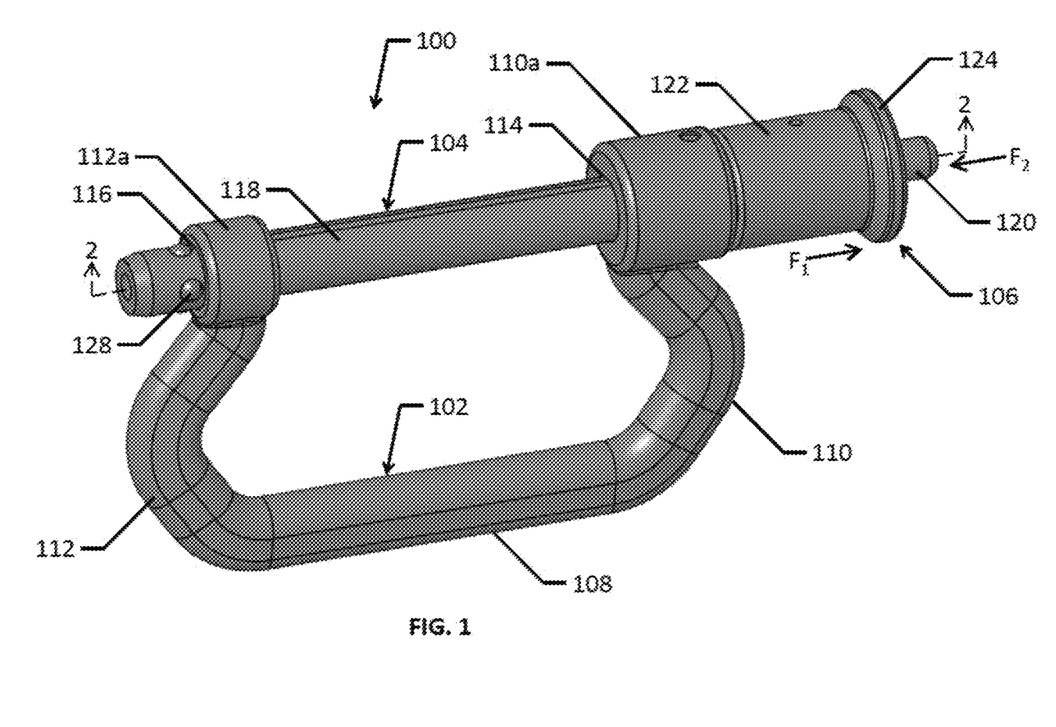
FIG. 1 is a perspective view of a connector in a closed position.

Referring specifically to FIG. 1, the connector 100 is shown in a closed and locked position. The connector 100 includes a body 102, a gate 104, and a double action locking mechanism 106. The body 102 includes a spine 108, a first arm 110, and a second arm 112. The first arm 110 and the second arm 112 both extend from the spine 108 to define an opening to enable, for example, an anchor yoke of an SRL, anchor, harness, or the like to be secured to the connector 100. The first arm 110 and second arm 112 each have end members 110a, 112a having inner and outer surfaces and which define a first aperture 114 and a second aperture 116, respectively, extending between their respective inner and outer surfaces. The first aperture 114 and the second aperture 116 are axially aligned and sized such that the gate 104 may pass through the apertures. Preferably, the gate 104 has an outer diameter slightly less than the diameter of the first and second apertures such that the gate can move axially relative to, and pass through, the first aperture 114 and the second aperture 116 with a running fit. As seen, the gate 104 has an overall length greater than the distance between the outer surfaces of the end members 110a, 112a, such that a portion of the gate 104 extends beyond the outer surfaces of each end member.

Figure 2:
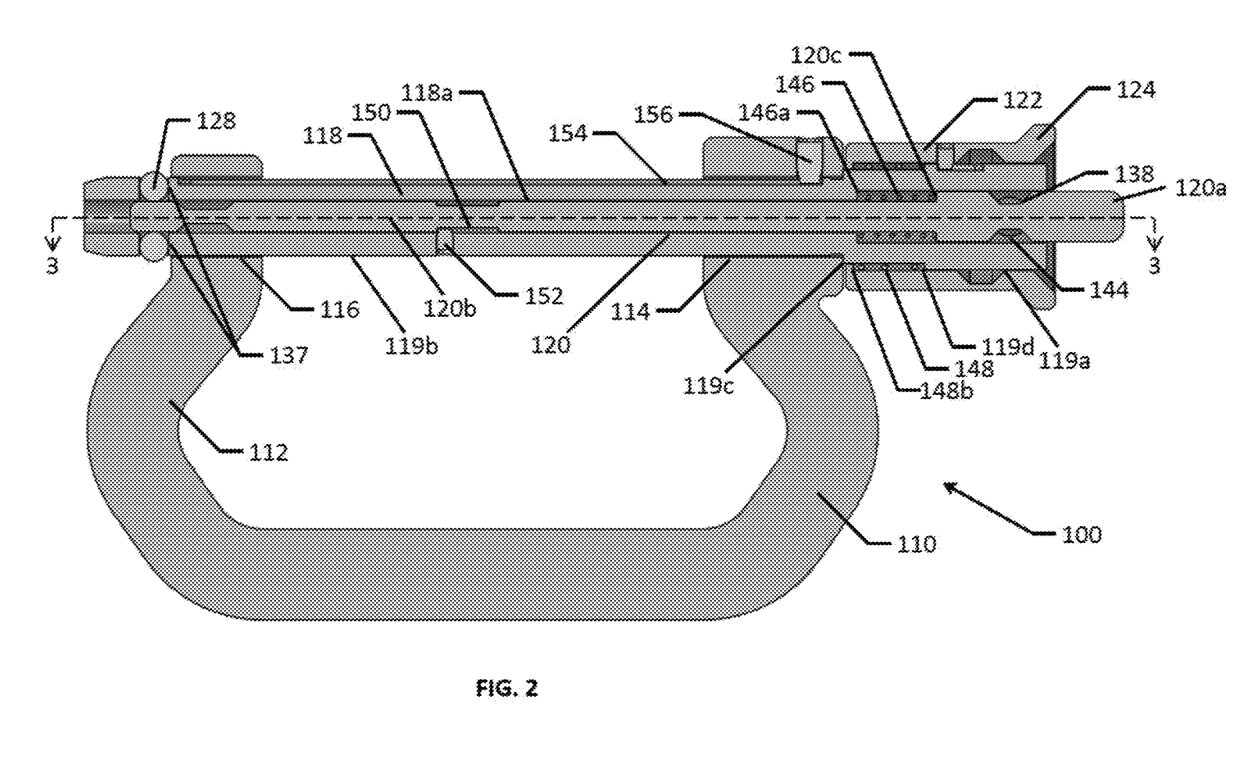
FIG. 2 is a sectional view of the connector in a closed position taken along line 2-2 of FIG. 1.
Figure 3:
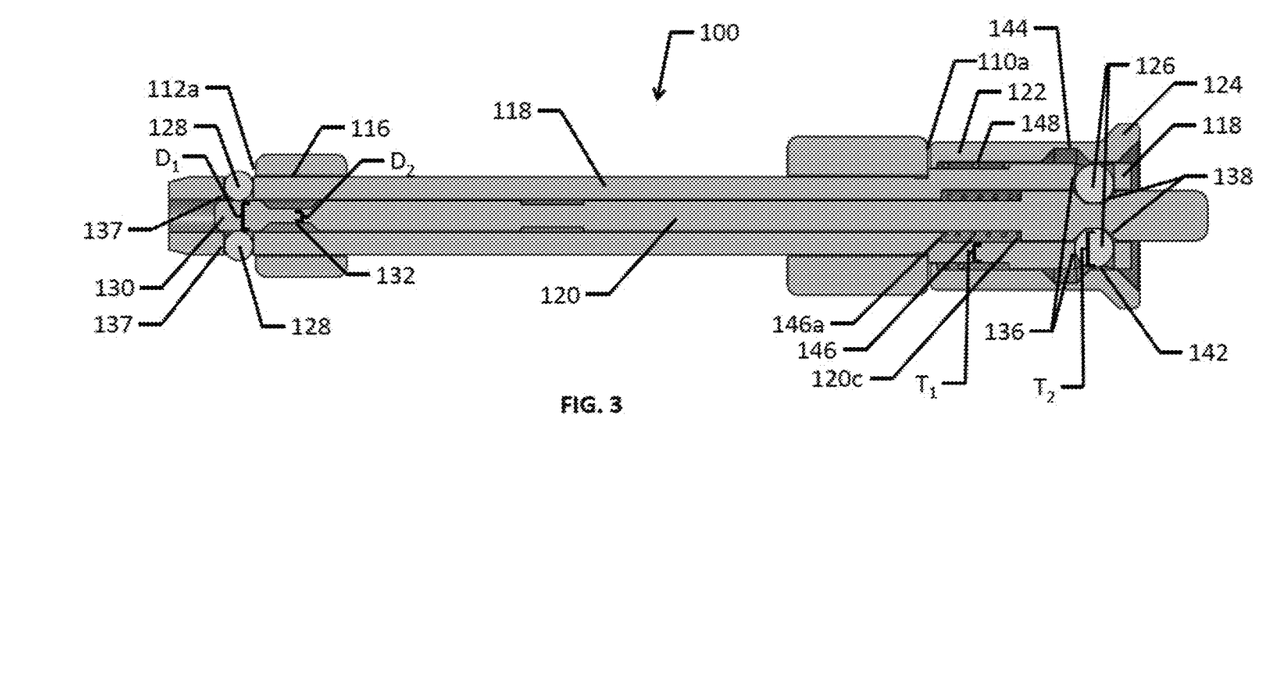
FIG. 3 is a sectional view of the connector in a closed position taken along line 3-3 of FIG. 2.
Figure 4:
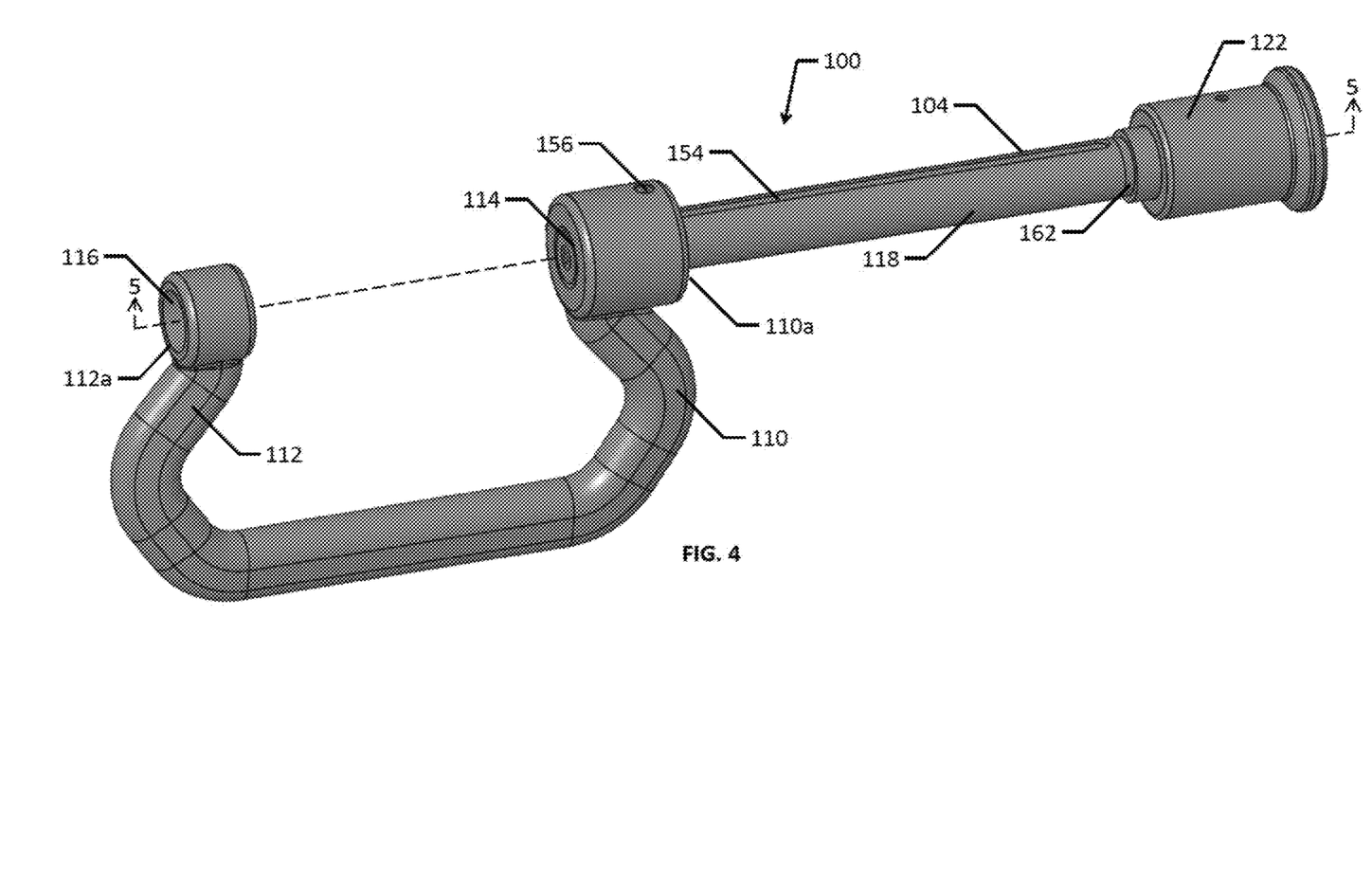
FIG. 4 is a perspective view of the connector in an open position.
Figure 5:
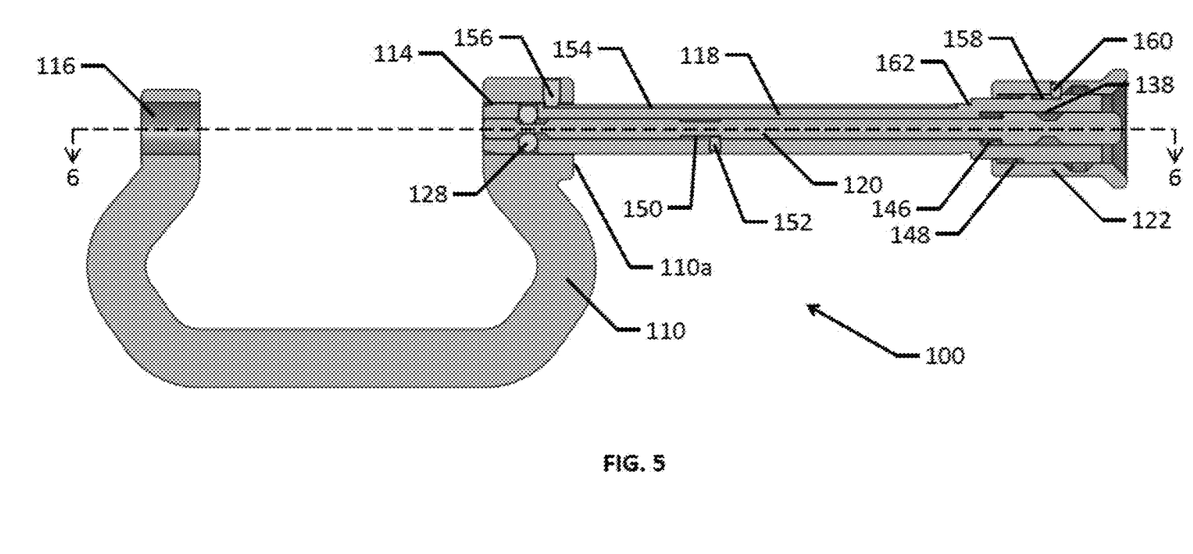
FIG. 5 is a sectional view of the connector in an open position taken along line 5-5 of FIG. 4.
Figure 6:
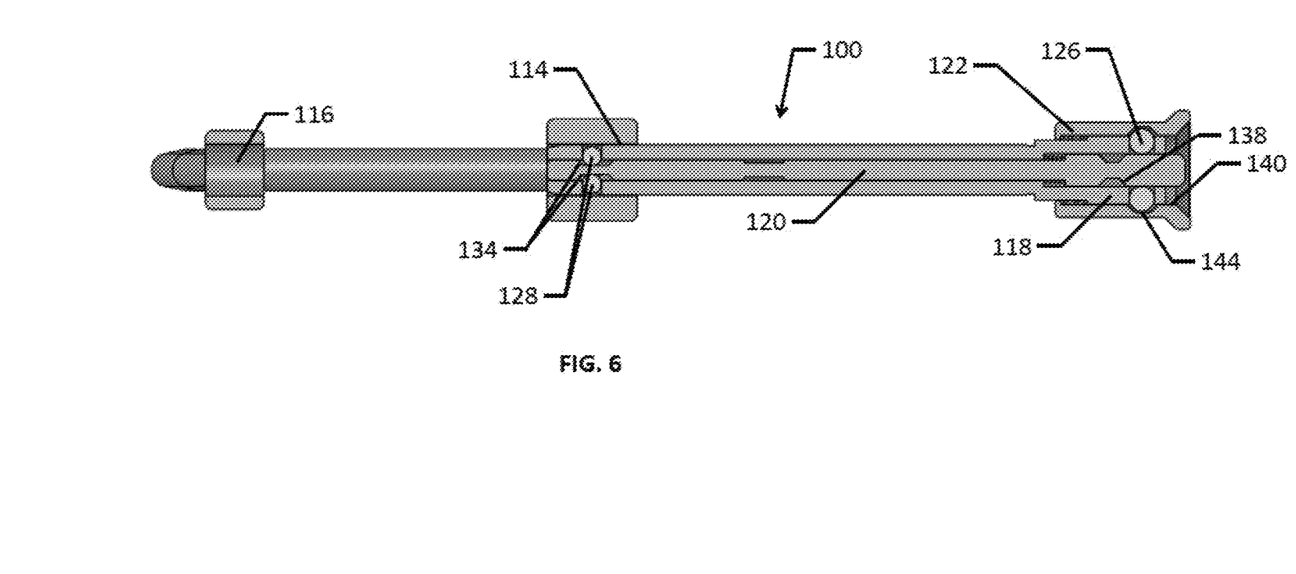
FIG. 6 is a sectional view of the connector in an open position taken along line 6-6 of FIG. 5.

The gate 104 is adapted and configured to move between an open position, as shown in FIGS. 4-6, and a closed position, as shown in FIGS. 1-3. The open position permits the gate 104 to be passed, for example, through a ring to connect the connector 100 to an SRL, harness, or anchor. In the open position (e.g., as shown in FIG. 4), the gate 104 has been moved rearwardly such that it extends through only the first aperture 114, such that the forward end of the gate 104 is spaced from the inner surface of the second end member 112a of the second arm 112, thereby allowing a ring to be passed over the gate. In the closed position (e.g., as shown in FIG. 1), the gate 104 extends through both the first aperture 114 and the second aperture 116, and the forward end of the gate extends beyond (forward of) the outer surface of the second end member 112a, thereby preventing a ring from being removed from, or applied to, the connector.

The double action locking mechanism 106 is adapted and configured to selectively permit or prevent the gate 104 to be moved from the closed position to the open position. The double action locking mechanism 106 is adapted and configured to require a simultaneous application of two distinct and different forces to unlock the locking mechanism and permit the gate 104 to move to the open position. For example, the forces, F1 and F2 (FIG. 1), may be parallel with centerline axes of the gate 104 and locking mechanism 106 and opposed one hundred eighty degrees. In some embodiments, the second force F2 is coaxial with the gate 104 and the first force F1 is radially offset from a center axis of gate 104. The connector 100 is configured such that application of a single force will not actuate the locking mechanism to permit the gate to move to the open position.

The gate 104 includes a gate shaft 118 adapted and configured to pass through the first aperture 114 and the second aperture 116, preferably with a running fit, as described above. The gate shaft 118 defines a rear portion 119a and a forward portion 119b having a diameter smaller than the rear portion. A first shoulder 119c is defined at the junction between the rear and forward portions 119a,b of the gate shaft 118. The rear portion 119a of the gate shaft is stepped down in diameter at its approximate midpoint, and a second shoulder 119d is defined at this step. The rear portion 119a of the gate shaft has a diameter greater than the diameter of the first aperture 114, and the forward portion 119b, which forms the majority of the length of the gate shaft 118, has a diameter, as described above, sized to pass through the first and second apertures 114 and 116, respectively. As can be appreciated, this rear portion 119a acts as a stop and limits the extent to which the gate shaft 118 can be moved forwardly through the apertures 114 and 116 in the arm members 110a, 112a.

The gate shaft 118 defines a passage 118a which, as shown, extends through the gate shaft 118. The passage 118a of the gate shaft 118 defines a rear portion within the rear portion 119a of the gate shaft and a forward portion within the forward portion 119b of the gate shaft. The rear portion of the passage has a greater diameter than the forward portion of the passage and a shoulder 146a is defined at the junction between the rear and forward portions of the passage of the gate shaft 118. The gate shaft further includes a plurality of lateral passages or through holes 136, 137 spaced around the rear portion of the passage 118a and proximate the forward end of the gate shaft, respectively.

First and second detents 126, 128 are received in the lateral passages or through holes 136, 137, respectively. The lateral passages are formed in known ways to prevent the detents from fully exiting the lateral passages. The first and second detents 126, 128 are shown to be spherical bearings and are moveable between an extended position in which they protrude beyond the outer surface of the gate shaft 118 and a retracted position in which they are retracted into the gate shaft and do not extend beyond the outer surface of the gate shaft. Preferably, the detents 126, 128 are evenly spaced about the gate shaft 118. As will become apparent from the description below, when the connector is in the closed and locked position (shown in FIG. 3), the first detents 126 are in the retracted position and the second detents 128 are in the extended position. Conversely, in an unlocked position (shown in FIG. 6), the first detents 126 are in the extended position and second detents 128 are in the retracted position. It should be noted that, in some embodiments, the first and/or second detents 126, 128 are spring loaded detents to bias said detents in a locked position.

A first retention channel 154 (shown in FIGS. 2, 4, and 5) extends along the outer surface of the gate shaft 118, extending over a substantial distance of the forward portion of the passage 118a. As seen, the retention channel preferably has a depth less than the annular width of the gate shaft 118, and thus the channel 154 does not open into the passage 118a (although it could if desired). A pin 156 extends through the first end member 110a into the retention channel 154. As can be appreciated, the retention channel 154 defines the length of travel of the gate shaft 118 relative to the first end member 110a, and the interaction of the pin 156 with the retention channel 154 will prevent the gate shaft 118 from being withdrawn from the first end member 110a. Additionally, the interaction of the retention pin 156 and the retention channel rotationally fixes the gate shaft 118 relative to the first and second end members 110a, 112a. Thus, the gate shaft 118 will not rotate, but will only move axially.

The double action locking mechanism 106 (shown in FIGS. 1-3 and 5) includes a first (or "release") actuator 122 and a second (or "lock") actuator 120, both of which are coaxial with the gate shaft 118. The first actuator 122 comprises a sleeve which surrounds the gate shaft 118 on the rear portion 119a of the gate shaft 118 extending beyond the outer surface of the end member 110a of the first arm 110.

The first actuator 122 is in the form of a generally tubular sleeve having a flared back portion 124. The flared back portion facilitates use of the connector 100, as will become apparent. The sleeve defines an interior surface 140 having a rear portion having an inner diameter sized to slidingly fit over the rear portion 119a of the gate shaft 118. A shoulder 148b extends inwardly at the forward end of the sleeve 122. The interior surface 140 (shown in FIG. 6) of the sleeve 122 defines a locking portion 142 and an unlocking portion 144 (both shown in FIG. 3). The unlocking portion 144 comprises one of a circumferential channel or a plurality of offsets or depressions formed in the inner surface of the actuator sleeve. The depth of the unlocking portion is sized such that depth of the unlocking portion plus the length of a lateral passage 136 is at least equal to the diameter of the first detents 126. The locking portion 142 is defined by the inner surface of the sleeve 122 axially rearwardly of the unlocking portion 144.

A biasing spring 148 (shown in FIGS. 2-3) is positioned around the gate shaft 118 and within the first actuator 122 to be positioned between the shoulder 119d of the gate shaft and the internal shoulder 148b of the first actuator 122. This biasing spring 148 will bias the first actuator 122 forwardly relative to the gate shaft 118 such that the locking portion 142 of the first actuator 122 is biased to a locked position (e.g., as shown in FIG. 3) as will become clearer below. As can be appreciated, the shoulder 119d of the gate shaft 118 will prevent the first actuator 122 from being removed rearwardly from the gate shaft 118. The shoulder 119d also provides a surface for interaction with the biasing spring 148.

The first actuator 122 further includes a retention pin 160 (FIG. 5) which extends into a second retention channel 158 formed on rear portion 119a of the gate shaft 118. The retention pin 160 prevents the first actuator 122 from being removed from the gate shaft 188 rearwardly or forwardly. The second retention channel of the gate shaft is positioned over the rear portion of the passage 118a of the gate shaft and has an axially forward end positioned rearwardly of the shoulder 119d of the gate shaft. The axial length of the retention channel 158 defines the length of the path of travel of the first actuator 122 relative to the gate shaft 118. Additionally, as can be appreciated, the interaction of the retention pin 160 with the retention channel 158 prevents the first actuator 122 from rotating relative to the gate shaft 118. Thus, the first actuator will move only axially.

The second actuator 120 (shown in FIGS. 1-3 and 5) comprises an elongate shaft which is slidably received in the passage 118a of the gate shaft 118 and has a length greater than the distance between the outer surfaces of the arm end members 110a, 112a. As seen in FIGS. 1-3, when the connector is in the closed position, a rear portion of the second actuator 120 extends from the rear end of the gate shaft 118 rearwardly of the rear end of the first actuator 122.

The second actuator 120 defines a rear portion 120a and a forward portion 120b. The rear portion of the second actuator 120 has a greater diameter than the forward portion, and a shoulder 120c is defined at the junction between the rear and forward portions of the second actuator 120. As seen, the diameter of the rear portion of the second actuator is sized to be received within the rear portion of the gate shaft passage (such that the surface of the rear portion of the second actuator is proximate the inner surface of the gate shaft passage 118a). The forward portion of the second actuator is sized to be slidingly received in the forward portion of the gate shaft passage 118a. The diameter of the forward portion of the second actuator is sized to be received within the forward portion of the gate shaft passage (such that the surface of the forward portion of the second actuator is proximate the inner surface of the gate shaft passage 118a).

The second actuator 120 includes a rear locking notch 138 formed in the rear portion of the second actuator 120. The locking notch is formed as an annular channel or a plurality of circumferentially spaced offsets. The locking notch 138 defines a cavity sized to partially receive the detents 126, as seen in FIG. 3. The depth of the locking notch 138 is such that the depth of the locking notch and the length of a lateral passage 136 is at least equal to the diameter of the first detents 126 such that the detents can move between their retracted and extended positions.

Additionally, the second actuator includes, at its forward end, a forward locking portion 130 and a forward unlocking portion 132. (FIG. 3) The locking portion 130 is defined by the external surface of the forward portion of the second actuator at the forward most end of the second actuator. The locking portion 130 has a first diameter D1 which is sized to provide for a running fit between the locking portion 130 of the second actuator 120 and the gate shaft 118. As such, the diameter D1 is slightly less than the diameter of the forward portion of the passage 118a. The unlocking portion 132 is positioned axially behind the locking portion 130 and is defined by a circumferential channel 134. Preferably, the opposed annular walls of the circumferential channel 134 slope upwardly away from the floor of the channel 134. The unlocking portion has a second diameter D2 that is less than the first diameter D1. The second diameter D2 is sized such that the radial depth of the channel (i.e., D1-D2) plus the annular width of the gate shaft 118 (i.e., plus the length of the through holes 137) is at least equal to the diameter of the detents 128. Thus, when the connector is in the unlocked position, as seen in FIG. 5, the detents 128 do not extend above the outer surface of the gate shaft 118. Alternatively, the unlocking portion 132 can comprise a plurality of distinct axially extending channels 134 spaced evenly about the second actuator 120 (e.g., four channels spaced 90° apart). In this alternative example, each of the channels 134 would need to be radially aligned with the through holes 137, thus requiring that that the second actuator 120 be rotationally fixed relative to the outer gate shaft 118 to align each channel of the plurality of channels to a corresponding one of the second detents 128. This ensures that the channels 134 will remain aligned with the detents thus allowing for travel of the detents 128 into the channels 134 when unlocking the connector 100 (as shown in FIG. 6).

The second actuator 120 is biased to its locking position (FIGS. 2 and 3) by means of a spring 146 positioned between the internal shoulder 146a of the gate shaft 118 and the shoulder 120c of the second actuator. The spring 146 thus urges the second actuator rearwardly to the position shown in FIGS. 2 and 3.

Lastly, the second actuator 120 includes a channel 150 (FIGS. 2 and 5) located approximately midway along the length of the forward portion of the second actuator. In alternative embodiments, the channel 150 is located elsewhere along the second actuator 120. The channel has an axial length. A pin 152 extends through gate shaft 118 into the channel 150. As can be appreciated, the axial length of the channel defines the length of travel of the second actuator 120 relative to the gate shaft 118. The channel 150 can be an annular channel, in which case, its only function is to define the length of travel of the second actuator. However, if the channel 150 were an axially extending channel (i.e., not an annular channel), the interaction of the pin 152 with the channel 150 would prevent the second actuator 120 from rotating relative to the outer gate shaft 118. That is, the second actuator 120 would be rotationally fixed relative to the gate shaft 118. Additionally, the interaction of the pin 152 with the channel 150 defines an interference which will prevent the second actuator 120 from being withdrawn rearwardly or forwardly from the gate shaft 118.

To assemble the connector 100, the biasing spring 146 is positioned on the forward portion of the second actuator, and the second actuator is then inserted into the gate shaft 118 from the rear (with the detents 126, 128 already held captive by their respective lateral passages 136, 137). The retention pin 152 can then be inserted into the gate shaft to retain the second actuator within the gate shaft 118. The first actuator 122 is slid over the gate shaft 118 from the forward end of the gate shaft 118 after its biasing spring 148 has been put in position. The retaining pin 160 can then be passed through the sleeve 122 to retain the first actuator on the gate shaft 118. The order of assembling the gate 104 with the first and second actuators 122, 120 is not vital. With the gate 104 assembled, the gate can be placed in its unlocked position (as described below), and then inserted forwardly through the first aperture 114 and through the second aperture 116 of the first and second end members 110a, 112a. The gate can be rotated in the end members to align the retention channel 154 with the passage in the first end member 110a that receives the retention pin 156. The retention member 156 is then inserted through the first end member 110a to extend into the retention channel.

When the gate 104 is in the closed and locked position (FIGS. 2 and 3), the gate 104 extends through the second end member 112a. The second detents 128 sit on the surface of the locking portion 130 of the second actuator 120 to protrude above the surface of the gate shaft 118. With the forward end of the gate shaft 118 being forward of the second end member 112a, the second detents 128 are positioned laterally beyond the outer surface of the second end member 112a. Thus, the gate cannot be moved rearwardly. Further, the first detents 126 are received in the locking notch 138 in the rear portion of the second actuator, and are held in place by the locking surface 142 of the first actuator. Thus, the first detents 126 will prevent the second actuator 120 from moving axially relative to the gate shaft 118. That is, the second actuator 120 cannot be moved forwardly to unlock the gate 104.

To move the gate 104 to an unlocked position, the user applies the first force F1 against the biasing spring 148 to move the first actuator 122 axially rearwardly (i.e., away from the first end member 110a) to a position in which the unlocking portion 144 of the first actuator is aligned with the first detents 126. As noted above, the combined lengths/depths of the lateral passages 136 and the unlocking portion 144 of the first actuator are sized to accommodate or receive the first detents 126. Thus, the second actuator can be urged forwardly against the second force F2 of the biasing spring 146. The sloped wall of the locking notch 138 of the second actuator will allow the first detents to ride up the wall onto the surface of the rear portion of the second actuator, and the detents will be pushed radially through the lateral passages 136 to protrude into the unlocking portion 144 of the first actuator. Additionally, as the second actuator 120 is moved forwardly, the forward unlocking channel 134 at the forward end of the second actuator will come into alignment with the second detents 128. This will allow the gate 104 to be pulled rearwardly through the second end member 112a, because, as the gate 104 is moved rearwardly, the second detents 128 will be urged into the unlocking channel 134 of the second actuator. As can be appreciated, the first and second actuators thus work in concert, and the second actuator 120 cannot be released unless the first actuator 122 is released.

The configuration of the double action locking mechanism 106 necessitates that the first force F1 be radially offset from the axis of the shaft of the second actuator 120. Although, the force F1 may be concentric with the axis of the shaft of the second actuator 120. This is because the second actuator 120 extends through the first actuator 122. This allows for a user to apply the second force F2 to the second actuator 120 while also applying the first force F1 to the first actuator 122.

The configuration described allows for a user to actuate the double action locking mechanism 106 with a single hand. For example, a user may grasp and actuate the first actuator 122 with one or more fingers and actuate the second actuator 120 with the thumb of the same hand.

As can be appreciated, the biasing springs 146 and 148 bias the gate 104 to be normally locked.

The first and second actuators as well as the gate shaft are retained such that the connector has no loose parts. The lengths of travel of the first actuator and of the second actuator relative to the gate shaft are defined by the respective retention channels 158 and 150, and the length of travel of the gate shaft relative to the first end member is defined by the retention channel 154. Further, the interaction of the various components will prevent the first and second actuators from being removed from the gate shaft, and will prevent the gate shaft from being removed from the connector body 102. The connector 100 may include a warning indicator 162 which is exposed when the gate 104 is not in the fully locked position. For example, the warning indicator 162 may be a groove, colored strip, symbol, and/or other indicator formed on the gate shaft 118 just forward of the shoulder 119c of the gate shaft which becomes exposed when the gate shaft 118 is moved rearwardly relative to the connector body 102.

Changes can be made in the above constructions without departing from the scope of the disclosure. It is intended that all matter contained in the above description or shown in the accompanying drawings shall be interpreted as illustrative and not in a limiting sense. For example, although the gate shaft 118, the first actuator 122 and the second actuator 120 are all shown or described to be cylindrical, and be circular in cross-section; these components could have any desired shape, as long as they are shaped complementarily to each other, to be movable relative to each other as described above. Thus, they could be triangular, quadrilateral, or oval in cross-section. The detents are not spring biased to their respective locking positions. However, they could be. If the detents were spring biased, they could formed as other than spherical bearings. These examples are merely illustrative.

We claim:

1. A connector for use with a fall protection system, the connector comprising:
   a body comprising a spine and two arms extending from the spine to form a gate opening, a first arm of the two arms defining a first aperture and a second arm of the two arms defining a second aperture, the first and second apertures being axially aligned;
   a gate adapted and configured to move axially through the first and second apertures between an open position and a closed position; the gate having a forward end and a rearward end; wherein, in the open position, the gate extends through the first aperture but the forward end of the gate is spaced rearwardly of the second aperture, and in the closed position, the gate extends through the first aperture and the second aperture; and
   a double action locking mechanism adapted and configured to selectively permit or prevent the gate to move into the open position, the double action locking mechanism adapted and configured to require application of two distinct and different forces to unlock the locking mechanism and permit the gate to move to the open position, wherein the double action locking mechanism comprises first and second actuators, said first and second actuators being adapted to work in concert whereby said second actuator cannot be released unless said first actuator is released.

2. The connector of claim 1, wherein the double action locking mechanism is adapted and configured to be normally locked.

3. A connector for use with a fall protection system, the connector comprising:
   a body comprising a spine and two arms extending from the spine to form a gate opening, a first arm of the two arms defining a first aperture and a second arm of the two arms defining a second aperture, the first and second apertures being axially aligned;
   a gate adapted and configured to move axially through the first and second apertures between an open position and a closed position; the gate having a forward end and a rearward end; wherein, in the open position, the gate extends through the first aperture but the forward end of the gate is spaced rearwardly of the second aperture, and in the closed position, the gate extends through the first aperture and the second aperture; wherein the gate comprises a gate shaft, the double action locking mechanism comprising a first actuator and a second actuator, the first and second actuators being coaxial with the gate shaft; and a double action locking mechanism adapted and configured to selectively permit or prevent the gate to move into the open position, the double action locking mechanism adapted and configured to require application of two distinct and different forces to unlock the locking mechanism and permit the gate to move to the open position.

4. The connector of claim 3, wherein the two distinct and different forces are parallel with the first and second actuators and have opposite directions.

5. The connector of claim 3, wherein the second actuator is slidably received within the gate shaft and the first actuator slidably receives the gate shaft.

6. The connector of claim 3, wherein the connector further comprises a first set of detents and a second set of detents; said first and second sets of detents being captive in forward and rearward lateral passages, respectively, within the gate shaft and being moveable in the lateral passages between an extended position and a retracted position, the first set of detents being proximate the rearward end of said gate shaft and the second set of detents being proximate the forward end of said gate shaft; the first and second sets of detents extending beyond an outer diameter of the gate shaft when in the extended position, the second set of detents interfering with the second arm when in the extended position such that the gate shaft is not permitted to pass through the second aperture from the closed position to the open position.

7. The connector of claim 6, wherein the lateral passages have a length less than a dimension of said first and second detents, respectively.

8. The connector of claim 6, wherein the second actuator comprises, at a forward end of the second actuator, a forward locking portion and a forward unlocking portion; the forward locking portion having a first diameter and the forward unlocking portion having a second diameter less than the first diameter, the first diameter being sized to provide for a running fit between the locking portion of the second actuator and the gate shaft, the second diameter being sized such that a difference between the first and second diameters plus a length of said lateral passages in the gate shaft which receives the detents defines a length at least equal to a diameter of said second detents such that the unlocking portion of the second actuator is capable of receiving the second set of detents within the unlocking portion and with the received second set of detents having a running fit with the second aperture.

9. The connector in accordance of claim 8, wherein the forward unlocking portion defines either a circumferential channel or a plurality of axially extending channels.

10. The connector of claim 6, wherein the second actuator comprises a rearward locking portion and a rearward unlocking portion axially rearward of said rearward locking portion; said rearward unlocking portion comprising a surface of said second actuator defining a diameter sized to provide for a running fit between the rearward locking portion of the second actuator and the gate shaft; said rearward unlocking portion comprising one of an annular circumferential locking channel or a plurality of axially extending locking notches, said rearward unlocking portion having a depth which, in combination with a length of said lateral passages, defines a length at least equal to a dimension of said first detents, wherein when the rearward locking portion is aligned with said first detents, a portion of each of said first detents will be received in said rearward locking portion to interfere with movement of said second actuator relative to said gate shaft.

11. The connector of claim 3, wherein the first actuator is generally tubular and defines an inner surface; said first actuator being sized to slidably receive said gate shaft; the first actuator comprising a first actuator locking portion and a first actuator unlocking portion, the first actuator locking portion having a running fit with the gate shaft, the first actuator unlocking portion comprising, on an inner surface thereof, one of an annular channel or a plurality of radially spaced apart offsets, said first actuator unlocking portion having a depth which in combination with a length of said rear lateral passages, defines a length at least equal to a dimension of said first detents.

12. The connector of claim 3, wherein the connector comprises a first actuator biasing spring, the first actuator biasing spring being positioned within the first actuator around the gate shaft and between facing surfaces of said first actuator and said gate shaft; the first actuator biasing spring urging the first actuator to a locking position in which the first set of detents are urged by said locking surface of said first actuator radially inwardly to engage the rearward locking portion of said second actuator such that said second actuator cannot move relative to said gate shaft.

13. The connector of claim 3, wherein the connector comprises a second actuator biasing spring, the second actuator biasing spring being positioned around the second actuator and within the gate shaft between facing surfaces of said second actuator and gate shaft, whereby the second actuator biasing spring urges the second actuator to a locking position in which the second set of detents are engaged with said locking portion of said second actuator whereby said gate is prevented from being moved rearwardly relative to said second arm aperture.

14. The connector of claim 3, wherein the second actuator further comprises a retention channel having an axial length, and the gate shaft further comprises a retention pin fixed relative to the gate shaft and extending into the retention channel; the axial length of the retention channel defining a length of travel of said second actuator relative to said gate shaft.

15. The connector of claim 3, wherein the gate shaft further comprises an elongate axially extending gate retention channel having an axial length, and the first arm comprises a retention pin fixed relative to the first arm and extending into the gate retention channel; the axial length of the gate retention channel defining a length of travel of said gate shaft relative to said first arm.

16. The connector of claim 3, wherein the gate shaft further comprises a first actuator retention channel proximate the rearward end of said gate shaft and having an axial length, and the first actuator further comprising a retention pin fixed relative to the first actuator and extending into the first actuator retention channel, the axial length of the first actuator retention channel defining a length of travel of said first actuator relative to said first gate shaft.

17. A connector comprising:
  a body comprising a spine and first and second arms extending from the spine to form a gate opening; said first and second arms defining first and second apertures, respectively, the first and second apertures arms being axially aligned;
  a gate extending through said first and second apertures; said gate being movable axially relative to said apertures between an open position in which a forward end of said gate is between said arms to permit passage between the two arms of the body, and a closed position in which said forward end of said gate is received by said second aperture in which said gate closes said opening; said gate comprising:
- a gate shaft having a forward end and a rearward end; a passage extending through said gate shaft from said forward end to said rearward end; at least one forward lateral passage proximate said forward end of said gate shaft and at least one rearward lateral passage proximate said rearward end of said gate shaft; said forward and rearward lateral passages extending between an outer surface of said gate shaft and said passage; and a detent received in each of said lateral passages; said detents each being moveable between an extended position in which said detents extend beyond said outer surface of said gate shaft and a retracted position in which said detents do not extend above the outer surface of said gate shaft;
- a lock actuator comprising a shaft slidably received in said passage of said gate shaft; said lock actuator comprising a forward locking surface, a forward unlocking notch, a rear locking notch, and a rear unlocking surface; said lock actuator being movable between (1) a locked position in which said forward locking surface is aligned with said at least one forward lateral passage and said rear locking notch is aligned with said at least one rear lateral passage, and (2) an unlocked position in which said forward unlocking notch is aligned with said at least one forward lateral passage and said rear unlocking surface is aligned with said at least one rear lateral passage; whereby, when said lock actuator is in said locking position, said at least one forward detent is in said extended position to prevent rearward travel of said gate shaft relative to said connector body; and
- a release actuator comprising a sleeve slidable over said gate shaft; said sleeve having an inner surface having a locking surface and an unlocking notch; wherein said release actuator is axially movable relative to said gate shaft between a locking position in which said locking surface is aligned with said at least one rear lateral passage and an unlocking position in which said unlocking notch is aligned with said at least one rear lateral passage;

whereby, said lock actuator and release actuator comprise a double action locking mechanism adapted and configured to selectively permit or prevent the gate to move into the open position, the double action locking mechanism adapted and configured to require a simultaneous application of two distinct and different forces to permit the gate to move to the open position.

18. The connector of claim 17, wherein at least one of said notches of said lock actuator and said release actuator is defined by a circumferential channel or depression in their respective surface.

19. The connector of claim 17, wherein the connector comprises first and second biasing element to normally bias said lock actuator and said release actuator to their locked positions.

20. The connector of claim 19, wherein said first and second biasing elements define said two distinct and different forces.

* * * * *